United States Patent Office 3,069,413
Patented Dec. 18, 1962

3,069,413
16α-METHYL PREGNANES
John A. Zderic and Howard J. Ringold, Mexico City, Mexico, assignors, by mesne assignments, to Syntex Corporation, a corporation of Panama
No Drawing. Filed Mar. 8, 1960, Ser. No. 13,427
Claims priority, application Mexico Mar. 11, 1959
12 Claims. (Cl. 260—239.5)

The present invention relates to a novel method for the preparation of 16-methyl-$\Delta^4$-pregnene-17α,21-diol-3,20-dione which is an important intermediate for the preparation of 16-methyl cortical hormones.

More particularly the present invention comprises a novel method for hydroxylation at C–17α of the known 16α-methyl-allopregnan-3β-ol-20-one or of 16α-methyl-pregnenolone. Prior art methods for introduction of a hydroxyl group at C–17α of a 16-methyl-pregnan-20-one which involve the formation of the $\Delta^{17(20)}$-enol acetate, followed by treatment with an organic peracid and then subsequent alkaline treatment of the thus formed 17,20-epoxide do not proceed satisfactorily in the presence of a methyl group at C–16.

In accordance with the present invention, there has been discovered a novel process for introduction of a hydroxyl group at C–17α in high yield and under conditions whereby the process is especially adaptable to large scale production.

It has been discovered that dibromination at C–17α and C–21 of a 16-methyl-pregnan-20-one-3-ol followed by interchange of the bromine at C–21 by iodine and reaction with an alkali metal lower alkoxide such as sodium methoxide, there is obtained the lower alkyl ester, specifically the methyl ester, of the respective $\Delta^{17(20)}$-21-carboxylic acid which is then reduced to the corresponding alcohol by reaction with a double metal hydride. Monoacetylation of the resulting 3,21-diol at C–21 followed by oxidation of the hydroxyl group at C–3 to the keto group and further treatment with phenyliodosoacetate produces the 16α-methyl-17α-hydroxy-21-acetoxy compound. Alternatively, the reduction may follow oxidation of the 3β-hydroxyl group to the keto group; in that case the 3-keto group is temporarily protected by formation of an enamine, and after hydrolysis of the enamine, the $\Delta^{17(20)}$-pregnan-21-ol is acetylated at C–21 and subsequently is treated with phenyliodosoacetate.

The following equation serves to illustrate in part the present invention:

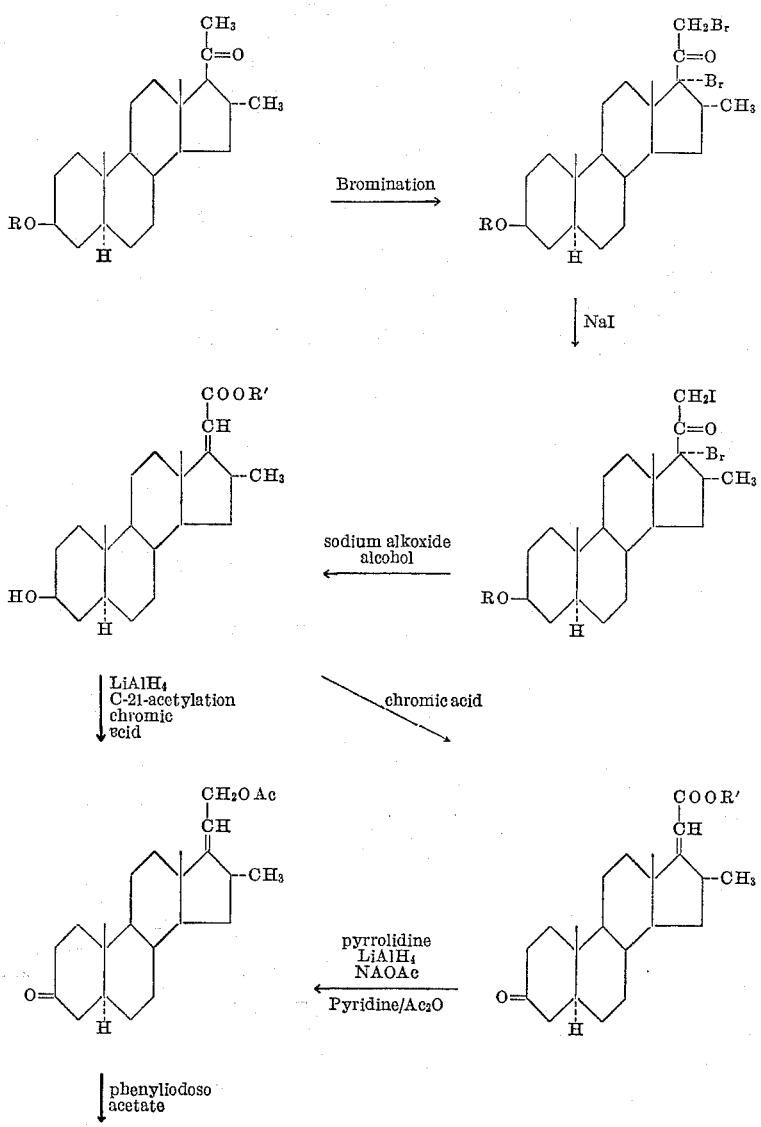

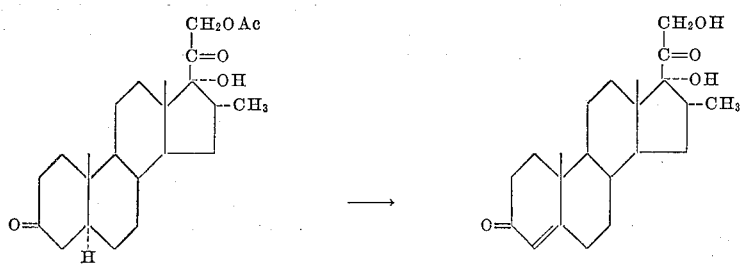

In the above equation, Ac represents the acetyl group, R represents a hydrocarbon carboxylic acyl group, preferably an acyl group derived from a lower hydrocarbon carboxylic acid, and R' represents lower alkyl.

In practicing the above invention, an ester of 16α-methyl-allopregnan-20-one-3β-ol, preferably the acetate thereof, is treated with 2 molar equivalents of bromine to form the 3β-acetoxy-16α-methyl-17α,21-dibromo-allopregnan-20-one, which is then treated with sodium iodide in a mixture of benzene and ethanol to obtain 3β-acetoxy - 16α - methyl-17α-bromo-21-iodoallopregnan-20-one. By subsequent reaction with an alkali metal alkoxide such as methoxide in methanol solution, the alkyl ester, specifically the methyl ester of 16α-methyl-$\Delta^{17(20)}$-allopregnen-3β-ol-21-carboxylic acid is obtained which can then be oxidized to the methyl ester of 16α-methyl-$\Delta^{17(20)}$-3-keto-21-carboxylic acid by treatment with 8 N chromic acid. The keto group is protected by heating with pyrrolidine in methanol to form the pyrrolidyl-enamine and the resulting methyl ester of 3-pyrrolidyl-16α - methyl - $\Delta^{2,17(20)}$-allopregnadiene-21-carboxylic acid is refluxed with lithium aluminum hydride in a solvent such as tetrahydrofuran to reduce the carbomethoxy group to the hydroxymethyl group. Upon subsequent hydrolysis of the enamine group, as by heating with sodium acetate in mixture with methanol and aqueous acetic acid under reflux conditions, there is obtained 16α-methyl-$\Delta^{17(20)}$-allopregnan-21-ol-3-one which is then acetylated at C–21 by conventional methods. The resulting compound is then treated with phenyliodosoacetate in aqueous t-butanol and in the presence of pyridine and catalytic amounts of osmium tetroxide to furnish the 21-acetate of 16α-methyl-allopregnane-17α,21-diol-3,20-dione which can then be converted by conventional methods, as disclosed by Rosenkranz et al. in U.S. Patent 2,703,805 to 16α-methyl-$\Delta^4$-pregnene-17α,21-diol-3,20-dione.

Alternatively the methyl ester of 16α-methyl-$\Delta^{17(20)}$-allopregnen-3β-ol-21-carboxylic acid can be treated with lithium aluminum hydride to reduce the C–21 carbomethoxy group to form 16α-methyl-$\Delta^{17(20)}$-allopregnene-3β,21-diol which is selectively acetylated at C–21 by reaction with 1 molar equivalent of acetic anhydride in pyridine solution at low temperature and then is subjected to the action of 8 N chromic acid to oxidize the C–3 hydroxyl group to the keto group to thus form the 21-acetate of 16α-methyl-$\Delta^{17(20)}$-allopregnen-21-ol-3-one. Subsequent treatment with phenyliodosoacetate yields the 21-acetate of 16α-methyl-allopregnane-17α,21-diol-3,20-dione, identical with the compound obtained in accordance with the procedure hereinabove described.

The following equation serves to illustrate another portion of the present invention:

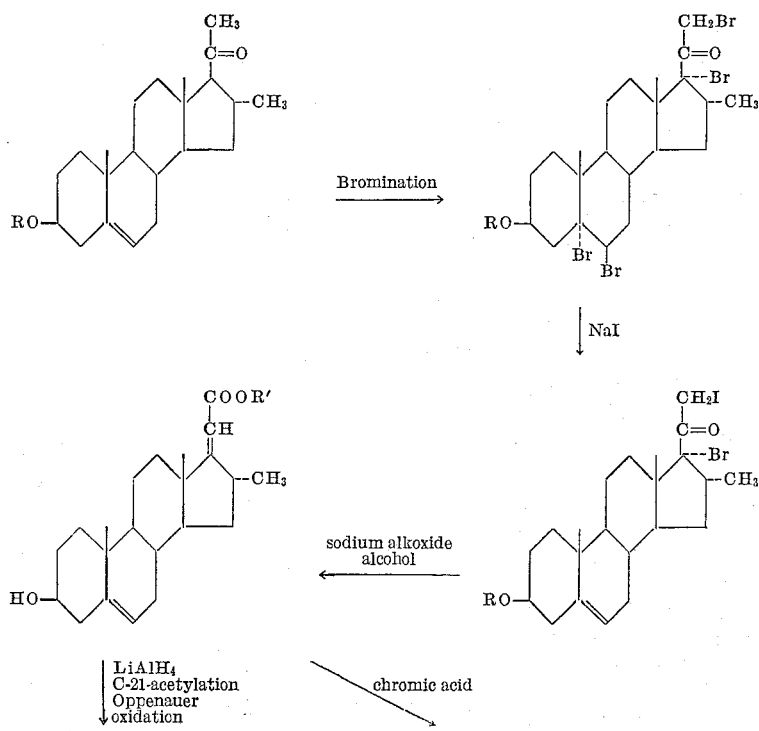

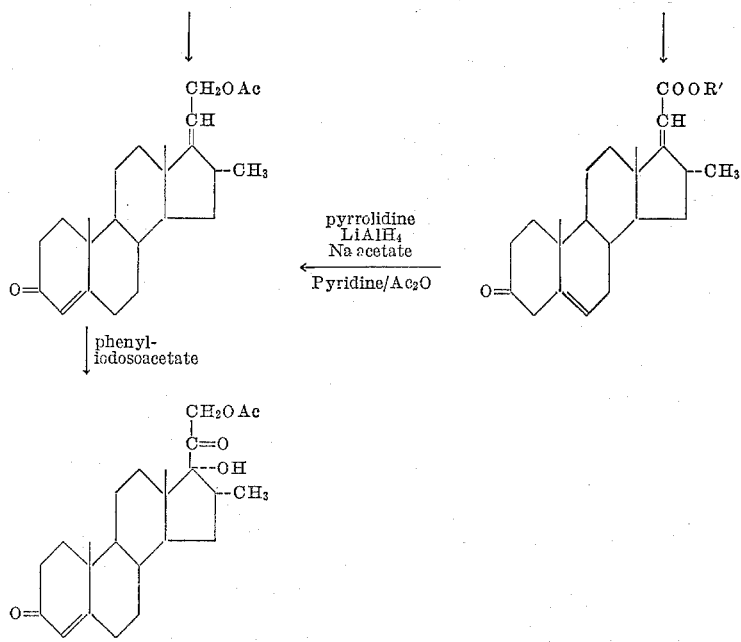

In the above equation, R, R' and Ac have the same meanings as heretofore described.

In practicing the process just outlined, an ester of 16α - methyl - Δ⁵ - pregnen - 20 - one - 3β - ol, preferably the acetate, is converted into 3β-acetoxy-16α-methyl-5α,6β,17α,21-tetrabromo-pregnan-20-one by reaction with 3 molar equivalents of bromine and upon subsequent treatment with sodium iodide, 3β-acetoxy-16α-methyl-17α - bromo - 21 - iodo - Δ⁵ - pregnen - 20 - one is obtained. Treatment of the latter with sodium methoxide affords the methyl ester of 16α-methyl-Δ⁵,¹⁷⁽²⁰⁾-pregnadien-3β-ol-21-carboxylic acid. The hydroxy group at C–3 is transformed into the 3-keto group by reaction with 8 N chromic acid. Prior to the reduction of the ester group at C–21, the 3-keto group of the methyl ester of the 16α-methyl-Δ⁴,¹⁷⁽²⁰⁾-pregnadiene 21-carboxylic acid is protected by formation of a pyrrolidyl enamine by heating with pyrrolidine in methanol. The keto group may also be protected by the formation of the 3-alkyl enol ether or a cycloalkyleneketal by known methods. The reaction of the methyl ester of 3-pyrrolidyl-16α-methyl-Δ³,⁵,¹⁷⁽²⁰⁾-pregnatriene - 21 - carboxylic acid with lithium aluminum hydride in the same manner, as set forth previously, results in the formation of 3-pyrrolidyl-16α-methyl-Δ³,⁵,¹⁷⁽²⁰⁾-pregnatrien-21-ol, which upon subsequent hydrolysis of the enamine group as by treatment with a mixture of acetic acid and sodium acetate affords 16α-methyl-Δ⁴,¹⁷⁽²⁰⁾-pregnadien-21-ol-3-one whose acetate is then subjected to reaction with phenyliodosoacetate to obtain the 21-acetate of 16α - methyl - Δ⁴ - pregnene-17α,21-diol-3,20-dione.

Alternatively the methyl ester of 16α-methyl-Δ⁵,¹⁷⁽²⁰⁾-pregnadien-3β-ol-21-carboxylic acid can be reacted with lithium aluminum hydride to reduce the carbomethoxy group to the hydroxymethyl group to thus form 16α-methyl - Δ⁵,¹⁷⁽²⁰⁾ - pregnadiene - 3β,21 - diol. Selective acetylation at C–21 as hereinabove set forth followed by oxidation under Oppenauer conditons results in the formation of 16α - methyl - Δ⁴,¹⁷⁽²⁰⁾ - pregnadien - 21 - ol-3-one acetate which upon treatment with phenyliodosoacetate gives the same 16α-methyl-Δ⁴-pregnene-17α,21-diol-3,20-dione 21-acetate obtained by the above procedures.

The latter product is an important intermediate which can be transformed into the useful 16α-methyl corticoids by introduction of the hydroxyl group at C–11 by known microbiological methods. By treatment with chloranil under reflux conditions in ethyl acetate-acetic acid, the 21 - acetate of 16α-methyl-Δ⁴-pregnene-17α,21-diol-3,20- dione can be converted into the 21-acetate 16α-methyl-Δ⁴,⁶-pregnadiene-17α,21-diol-3,20-dione which in turn can further be dehydrogenated at C–1,2 by conventional methods such as treatment with SeO₂ or by microbiological methods as by incubation with a micro-organism such as the fungus Streptomyxa affinis ATCC 6737 to form 16α - methyl - Δ¹,⁴,⁶-pregnatriene-17α,21-diol-3,20-dione. The latter can also be obtained by treating the 21 - acetate of 16α-methyl-Δ⁴-pregnene-17α,21-diol-3,20-dione with chloranil in mixture with n-amyl alcohol under reflux conditions.

By applying the novel process of this invention to 16β-methyl - 3β - acetoxy - allopregnan - 20 - one and 16β-methyl-3β-acetoxy-Δ⁴-pregnen-20-one, there can be obtained the corresponding 16β-methyl-17α-hydroxy-21-acetoxy compounds.

*Example 1*

A solution of 50 g. of 3β-acetoxy-16α-methyl-Δ⁵-pregnen-20-one in 500 cc. of glacial acetic acid was treated with 27.4 g. of bromine at room temperature; a few drops of a solution of dry hydrogen bromide in acetic acid were then added, followed by the slow addition of 44.8 g. of bromine, with stirring. The mixture was stirred until almost complete decoloration, then poured into water and the bromination product was collected by filtration, washed with water, dried and recrystallized from acetone. There was thus obtained 3β-acetoxy-16α-methyl-5α,6β,17α,21-tetrabromo-pregnan-20-one; M.P. 172–174° C.; [α]$_D$+28° (chloroform).

A mixture of 70 g. of the above compound, 240 g. of sodium iodide and 2 lt. of equal parts of benzene and ethanol was kept overnight at room temperature and then poured into water and extracted with ethyl acetate. The extract was washed with water, dried over anhydrous sodium sulfate and the solvent was evaporated. Crystallization of the residue from benzene-ether afforded 3β-acetoxy - 16α - methyl-17α-bromo-21-iodo-Δ⁵-pregnen-20-one; M.P. 165–167° C.; [α]$_D$+68° (chloroform).

To a solution of sodium methoxide prepared by dissolving 15 g. of sodium in 100 cc. of methanol, was added 20 g. of 3β-acetoxy-16α-methyl-17α-bromo-21-iodo-Δ⁵-pregnen-20-one and the mixture was allowed to react overnight at room temperature. After pouring into water the product was extracted with ethyl acetate; the extract was washed with dilute hydrochloric acid and then with water, dried over anhydrous sodium sulfate and the ethyl acetate was evaporated. Crystallization of the residue from ethyl acetate furnished the methyl ester of 16α-methyl-Δ$^{5,17(20)}$-pregnadien-3β-ol-21-carboxylic acid; M.P. 166–169° C.; [α]$_D$—70° (chloroform);

$$\lambda_{max.}^{EtOH} \ 226–228 \ m\mu, \ \log E \ 4.14$$

A solution of 14 g. of the above compound in 240 cc. of acetone was cooled to 0° C. and treated under an atmosphere of nitrogen and with continuous stirring at 0° C. with an 8 N solution of chromic acid until the brown-red color of chromium trioxide persisted in the mixture (the 8 N solution of chromic acid had been prepared by dissolving chromium trioxide in concentrated sulfuric acid and diluting with water); the mixture was then stirred for 5 minutes more at 0° C., diluted with water and the precipitate was collected, washed with water, dried and recrystallized from acetone-ether. There was thus obtained the methyl ester of 16α-methyl-Δ$^{5,17(20)}$-pregnadiene-3-keto-21-carboxylic acid; M.P. 164–166° C.; [α]$_D$—68° (chloroform);

$$\lambda_{max.} \ 226 \ m\mu, \ \log E \ 4.06$$

To a solution of 10 g. of the above compound in 200 cc. of boiling methanol was added 10 cc. of pyrrolidine and the mixture was allowed to attain room temperature; the precipitate was collected, dried and recrystallized from hexane. There was thus obtained the methyl ester of 3-pyrrolidyl-16α-methyl-Δ$^{3,5,17(20)}$-pregnatriene-21-carboxylic acid; M.P. 175–177° C.; [α]$_D$—190° (pyridine);

$$\lambda_{max.}^{EtOH} \ 230, \ 276–280 \ m\mu, \ \log E \ 4.26, \ 3.97$$

A mixture of 8 g. of the above compound, 400 cc. of tetrahydrofurane and 8 g. of lithium aluminum hydride was refluxed for one hour. Aqueous saturated sodium sulfate solution was then added, followed by anhydrous sodium sulfate; the solid was filtered and the solvent of the filtrate was evaporated. Recrystallization of the residue from hexane-ether yielded 3-pyrrolidyl-16α-methyl-Δ$^{3,5,17(20)}$-pregnatrien-21-ol.

A mixture of 6 g. of the above compound, 16 g. of sodium acetate, 40 cc. of water, 16 cc. of acetic acid and 20 cc. of methanol was refluxed for 4 hours and concentrated to a small volume under reduced pressure. The product was extracted with chloroform, the extract was washed with dilute hydrochloric acid and water; and the chloroform was evaporated, recrystallization of the residue from acetone-hexane afforded 16α-methyl-Δ$^{4,17(20)}$-pregnadien-21-ol-3-one.

A mixture of 4 g. of the above compound, 40 cc. of pyridine and 20 cc. of acetic anhydride was heated on the steam bath for half an hour; after pouring into water the mixture was heated for half an hour on the steam bath, cooled and the precipitate was collected, washed with water, dried and recrystallized from ether-hexane, thus producing the acetate of 16α-methyl-Δ$^{4,17(20)}$-pregnadien-21-ol-3-one.

To a solution of 3 g. of the above compound in 180 cc. of t-butanol and 4.5 cc. of pyridine was added a mixture of 30 mg. of osmium tetroxide, 15 cc. of t-butanol and 0.6 cc. of water, followed by slow addition of 7.5 g. of phenyliodosoacetate; all these operations were conducted at room temperature and under continuous stirring. The mixture was then stirred for 5 hours. 60 cc. of water was added and concentrated to a small volume under reduced pressure; the product was extracted with methylene chloride, the extract was washed with water, dried over anhydrous sodium sulfate and the solvent was evaporated. By chromatography of the residue on Florisil, eluting with mixtures of methylene chloride-acetone (75:25), there was obtained the 21-acetate of 16α-methyl-Δ$^4$-pregnene-17α,21-diol-3,20-dione.

Example 2

There was started from 50 g. of 3β-acetoxy-16α-methyl-allopregnan-20-one and essentially the same procedure described in the preceding Example was applied. In the step of bromination only 2 molar equivalents of bromine were used and there was obtained 3β-acetoxy-16α-methyl-17α,21-dibromo-allopregnan-20-one; the reaction of the latter with sodium iodide gave 3β-acetoxy-16α-methyl-17α-bromo-21-iodo-allopregnan-20-one, which was converted by treatment with sodium methoxide into the methyl ester of 16α-methyl-Δ$^{17(20)}$-allopregnen-3β-ol-21-carboxylic acid, which was in turn oxidized to the methyl ester of 16α-methyl-Δ$^{17(20)}$-allopregnene-3-keto-21-carboxylic acid; in the step of enamination there was obtained the methyl ester of the 3-pyrrolidyl-Δ$^{2,17(20)}$-allopregnadiene-21-carboxylic acid, which was reduced by the reaction with lithium aluminum hydride to 3-pyrrolidyl-16α-methyl-Δ$^{2,17(20)}$-allopregnadien-21-ol; upon hydrolysis of the enamine group there was obtained 16α-methyl-Δ$^{17(20)}$-allopregnen-21-ol-3-one; the latter was acetylated and then subjected to the reaction with phenyliodosoacetate to produce the 21-acetate of 16α-methyl-allopregnane-17α,21-diol-3,20-dione.

1 g. of the 21-acetate of 16α-methyl-allopregnane-17α,21-diol-3,20-dione was dissolved in 10 cc. of glacial acetic acid and treated with 0.2 cc. of a 4 N solution of dry hydrogen bromide in acetic acid and then with a solution of bromine in acetic acid containing approximately 2 molar equivalents of bromine, which addition was conducted little by little, with stirring at room temperature. The mixture was heated to 50° C., cooled, kept standing for 2 hours, diluted with water and the precipitate was collected, thus giving the crude 21-acetate of 2,4-dibromo-16α-methyl-allopregnane-17α,21-diol-3,20-dione, which was used for the next stage without further purification.

The above crude product was refluxed with 1.5 g. of sodium iodide in mixture with 100 cc. of acetone for 20 hours, then poured into water and the reaction product (21-acetate of 16α-methyl-2-iodo-Δ$^4$-pregnene-17α,21-diol-3,20-dione) was extracted. The solvent was evaporated and the residue was dissolved in 60 cc. of dioxane, treated with 1.5 g. of sodium bisulfite dissolved in 30 cc. of water and the mixture was refluxed for one hour, poured into water and extracted with ether; the extract was washed with water, dried over anhydrous sodium sulfate and the ether was evaporated. Recrystallization of the residue from acetone-hexane afforded the 21-acetate of 16α-methyl-Δ$^4$-pregnene-17α,21-diol-3,20-dione.

Example 3

In accordance with the method described in Example 1, the methyl ester of 16α-methyl-Δ$^{17(20)}$-allopregnen-3β-ol-21-carboxylic acid (cf. Example 2) was treated with lithium aluminum hydride and thus there was obtained 16α-methyl-Δ$^{17(20)}$-allopregnene-3β,21-diol.

To a solution of 5 g. of the above compound in 30 cc. of pyridine cooled to 0° C. was added 1 molar equivalent of acetic anhydride and the mixture was kept overnight at 0° C. After pouring into water the precipitate was collected, washed with water, dried and recrystallized from acetone-hexane. There was thus obtained the 21-acetate of 16α-methyl-Δ$^{17(20)}$-allopregnene-3β,21-diol.

By subsequent treatment with 8 N chromic acid, following the method described in Example 1, there was obtained the 21-acetate of 16α-methyl-Δ$^{17(20)}$-allopregnen-21-ol-3-one, identical with the intermediate of Example 2.

Example 4

In accordance with the method of Example 1, the methyl ester of 16α-methyl-Δ$^{5,17(20)}$-pregnadien-3β-ol-21-carboxylic acid, intermediate in such example, was reacted with lithium aluminum hydride to produce 16α-methyl-Δ$^{5,17(20)}$-pregnadiene-3β,21-diol, which was acetylated to the 21-acetate of 16α-methyl-Δ$^{5,17(20)}$-pregnadiene-3β,21-diol by reaction with 1 molar equivalent of acetic anhydride in pyridine solution (cf. Example 3).

The traces of moisture were removed from a mixture of 3 g. of the above compound; 400 cc. of toluene and 100 cc. of cyclohexanone, by distilling 100 cc. and then 3 g. of aluminum isopropylate in 80 cc. of anhydrous toluene, was added. The mixture was refluxed for 1 hour, diluted with water and the volatile solvents were removed by steam distillation. The cooled residue was extracted with ether, the extract was washed with water, 5% hydrochloric acid solution and again with water until neutral, dried over anhydrous sodium sulfate and the ether was evaporated. The crude product was purified by chromatography on neutral alumina. Recrystallization from acetone-hexane of the solid fractions afforded the acetate of 16α-methyl-$\Delta^{4,17(20)}$-pregnadien-21-ol-3-one, identical with the intermediate described in Example 1.

*Example 5*

A solution of 4 g. of the methyl ester of 16α-methyl-$\Delta^{5,17(20)}$-pregnadiene-3-keto-21-carboxylic acid (cf. Example 1) in 20 cc. of dioxane was treated with 4 cc. of ethyl orthoformate and 0.5 cc. of a solution prepared by dissolving 4.88 g. of p-toluenesulfonic acid in a mixture of 5.4 cc. of dioxane and 1.1 cc. of ethanol; the mixture was stirred at room temperature for 80 minutes, 1.5 cc. of pyridine was then added and the solvent was evaporated to dryness under reduced pressure. Recrystallization of the residue from methanol yielded the methyl ester of 16α-methyl-3-ethoxy-$\Delta^{3,5,17(20)}$-pregnatriene-21-carboxylic acid, M.P. 151–153° C.; $[\alpha]_D$—73.5° (chloroform); $\lambda_{max.}$ 234 m$\mu$, log E 4.51.

By subsequent reaction with lithium aluminum hydride, as described in Example 1, there was obtained 3-ethoxy-16α-methyl-$\Delta^{3,5,17(20)}$-pregnatrien-21-ol; M.P. 105–107° C.; $[\alpha]_D$—120° (chloroform);

$$\lambda_{max.}^{EtOH} \text{ 240-242 m}\mu, \log E\ 4.26$$

The ethoxy group was hydrolyzed by treatment with 0.5 g. of p-toluenesulfonic acid in solution in 50 cc. of acetone and keeping the reaction mixture overnight at room temperature. The product was precipitated with water, filtered, washed with water, dried and recrystallized from acetone-hexane. There was thus obtained 16α-methyl-$\Delta^{4,17(20)}$-pregnadien-21-ol-3-one, identical with the one described in Example 1.

*Example 6*

By treatment of a solution of 1 g. of 3-ethoxy-16α-methyl-$\Delta^{3,5,17(20)}$-pregnatrien-21-ol, of the preceding example, with 1 cc. of acetic anhydride in solution in 10 cc. of pyridine overnight, followed by the usual work up and recrystallization from hexane, there was obtained the 21-acetate of 3-ethoxy-16α-methyl-$\Delta^{3,5,17(20)}$-pregnatrien-21-ol in pure form; M.P. 86–88° C.;

$$\lambda_{max.}^{EtOH} \text{ 240-242 m}\mu, \log E\ 4.24$$

By subsequent hydrolysis of the ethoxy group as described in the preceding example, there was obtained the 21-acetate of 16α-methyl-$\Delta^{4,17(20)}$-pregnadien-21-ol-3-one, identical with the intermediate product described in Example 1.

We claim:
1. The lower alkyl esters of 16α-methyl-$\Delta^{5,17(20)}$-pregnadien-3-one-21-carboxylic acid.
2. The lower alkyl esters of 3-pyrrolidyl-16α-methyl-$\Delta^{3,5,17(20)}$-pregnatriene-21-carboxylic acid.
3. The lower alkyl esters of 3-ethoxy-16α-methyl-$\Delta^{3,5,17(20)}$-pregnatriene-21-carboxylic acid.
4. 3-pyrrolidyl-16α - methyl - $\Delta^{3,5,17(20)}$ - pregnatrien-21-ol.
5. 3-ethoxy-16α-methyl-$\Delta^{3,5,17(20)}$-pregnatrien-21-ol.
6. The acetate of 3-ethoxy-16α-methyl-$\Delta^{3,5,17(20)}$-pregnatrien-21-ol.
7. 3β-acetoxy-16α-methyl - 17α,21 - dibromo - allopregnan-20-one.
8. 3β - acetoxy-16α-methyl-17α-bromo-21-iodo-allopregnan-20-one.
9. The lower alkyl esters of 3-pyrrolidyl-16α-methyl-$\Delta^{2,17(20)}$-allopregnadiene-21-carboxylic acid.
10. 3-pyrrolidyl-16α-methyl - $\Delta^{2,17(20)}$ - allopregnadien-21-ol.
11. 16α-methyl-2,4-dibromo-allopregnane-17α,21 - diol-3,20-dione 21-acetate.
12. 16α-methyl-2-iodo-$\Delta^4$-pregnene-17α,21-diol - 3,20-dione 21-acetate.

References Cited in the file of this patent
UNITED STATES PATENTS

| | | |
|---|---|---|
| 2,305,727 | Miescher et al. | Dec. 22, 1942 |
| 2,359,773 | Marker et al. | Oct. 10, 1944 |
| 2,667,498 | Julian et al. | Jan. 26, 1954 |
| 2,982,776 | Chamberlein et al. | May 2, 1961 |

OTHER REFERENCES

Marker et al.: J.A.C.S. 64, 1280 (1942).

Disclaimer 3,069,413.—*John A. Zderic*, and *Howard J. Ringold*, Mexico City, Mexico. 16α-METHYL PREGNANES. Patent dated Dec. 18, 1962. Disclaimer filed Mar. 16, 1964, by the inventors, the assignee, *Syntex Corporation*, assenting.

Hereby enter this disclaimer to claim 11 of said patent.

[*Official Gazette June 2, 1964.*]